United States Patent Office 3,024,111
Patented Mar. 6, 1962

3,024,111

GRAVURE

Frank A. Sportelli, Holliswood, N.Y., assignor to Gravure Enterprises, Inc., New York, N.Y., a corporation of New York No Drawing. Filed July 21, 1958, Ser. No. 749,581
2 Claims. (Cl. 96—38)

This invention relates to improvements in the preparation of intaglio printing surfaces. More particularly, the invention is concerned with so-called reverse half tone intaglio printing surfaces, in which the printing surface reproduces the tint or density variation of the subject matter by means of a variation in the area of ink coverage as opposed to uninked printing surfaces.

The invention is concerned primarily with the preparation of printing surfaces, and principally multicolor printing surfaces, where a number of duplicate prints must be made either from different cylinders or different parts of the same cylinder.

A variety of processes for producing surfaces of this general character have been proposed but have found only limited acceptance. In some processes, continuous tone transparencies are involved creating great difficulty in accurate reproducibility from printing surface to printing surface, in others, the deepest tones producible by a cylinder may correspond to the middle tones of a relief half tone in which somewhat less than half the area carries ink, and is still others, involving the use of multiple screens, interference of screens with partial obliteration of detail and objectionable irregularities and moire effects in the printing are unavoidable. The present process provides a simple and reliable method for the production of reverse half tone intaglio printing surfaces, which is free of the above objectionable features.

In a typical method of practicing the present invention, a half tone transparency is prepared using the usual half tone camera with appropriate stops and screen spacing, so that a transparency is obtained in which the light tones of the picture are represented by isolated small opaque dots on a transparent ground, the middle tones are represented by larger dots which touch each other, thus covering about half the surface of the transparency, and the deep tones are represented by opaque areas upon which are interspersed disconnected transparent dots. Such half tone formations are shown, for example, in Hackleman, Commercial Engraving and Printing (1921), page 243, Figs. 677 and following. Where the screen utilized is a line screen of usual type, the dots will be centered at the intersections of the square screen ruling, as in the usual half tone print, but this centering is an approximate one only, due to parallax effects necessarily involved in the making of the picture. Thus, where a 100 line screen is utilized at a normal screen spacing, the actual distance between lines in the transparency may vary from a spacing of 100 to the inch to a spacing of about, say 95 to the inch. This point is of importance and has not been properly taken into account in any simple, reliable manner in any known prior processes.

As will be understood, where, as is usually the case, four half tone transparencies are prepared, one for each of the four colors involved in printing (key, yellow, red and blue, or other primary colors selected) a half tone screen will be rotated between transparencies, thus for a monotone half tone the screen may normally be at an angle of 45° to the vertical, the yellow perpendicular and the red and blue 15° to right and left of the perpendicular, respectively, the object of this placement being the avoidance of moire effects, as is well known.

A positive print is now made from each such half tone transparency, utilizing a comparatively fine gravure screen which has the capacity to break up the individual dots of the half tone image into smaller dots and also to break up the solid areas into a dot or cell formation suitable for preparation of a gravure printing surface.

The fineness of the half tone screen may be about 100 lines to the inch, in a typical case, but somewhat coarser or finer screens may be used, as for example, screens from about 75 to 125 lines per inch. The fine gravure screen may have 300 to 400 lines per inch and consists of opaque rulings defining transparent uniformly spaced and aligned dots, being thus essentially a conventional half tone screen, or reverse gravure screen. By the use of this screen, the individual half tone dots are bridged by the reverse gravure screen lines, so as to be decomposed into gravure or intaglio dots of substantially uniform depth.

The combination of the half tone transparency and reverse gravure screen has heretofore presented difficulties which the method of the present invention solves in a very satisfactory manner. Since the fine (reverse) gravure screen has uniform spacing between lines, and the half tone has a variation in line spacing due primarily to parallax in the camera, there is no set relation between the half tone transparency and fine gravure screen which can be used. It has been discovered, however, that by placing the screen on the half tone (or vice versa) and adjusting its position, a position of minimum and acceptable moire pattern can readily be found. The screen and half tone transparency are then marked for register or fastened together and printed by contact on a film (typically process, or line film) to produce a positive transparency, which will consist of a pattern of half tone dots, each broken up into small gravure dots so as to print in a manner similar to that now employed with typographic material in gravure printing. As many accurate reproductions of the positive transparency as are desired may be prepared without difficulty.

The method of the invention may be applied to preparing color printing surfaces in as many colors as desired (typically, four), utilizing color separation half tone transparencies with the usual screen angles and it is found that adjustment of the gravure screen position for each color prevents screen interference and objectionable moire effects as between the different gravure screens.

A transparency or transparencies prepared according to the invention may be used for preparing cylinders having any number of repetitions of the subject matter and without perceptible variation. Duplicate transparencies may also be prepared for use in different printing plants, obtaining a high degree of uniformity as between different editions or publications. In any case a line resist is preferred, whether in the form of a separate tissue or a coating on the cylinder surface, permitting a high degree of reproducibility in the etching. It is found that the typical printing produced is a time reverse half-tone since the ink used will have sufficient fluidity and flow on the paper or other material to obliterate the lines between the small intaglio printing cells.

What is claimed is:

1. Method of reverse half-tone printing which comprises superposing a line screen half-tone negative transparency of a subject and a several times finer uniform reverse gravure screen, the said transparency having substantially 75–100 screen lines per inch and the said screen having substantially 300–400 screen lines per inch, adjusting the relative positions of the transparency and screen to determine a position of minimum moire pattern, preparing a single transparency by exposure to the said two transparencies in registry in the said position, exposing a resist to the last said transparency, and utilizing the said resist to protect an intaglio printing surface while subjecting the same to treatment by etching fluid to prepare an intaglio printing surface.

2. Method of reverse half-tone printing which comprises superposing a line screen half-tone transparency of a subject having substantial parallax variation in its line spacing and a several times finer uniform gravure screen, the transparency having substantially 75–100 screen lines per inch and the said screen having substantially 300–400 screen lines per inch, adjusting the relative positions of the transparency and screen to determine a position of minimum moire pattern, preparing a single transparency by exposure to the said transparency and screen in registry in the said position, exposing a resist to the last said transparency, and utilizing the said resist to protect an intaglio printing surface while subjecting the same to treatment by etching fluid to prepare an intaglio printing surface.

References Cited in the file of this patent

UNITED STATES PATENTS

| | | |
|---|---|---|
| 2,010,042 | Stirling | Aug. 6, 1935 |
| 2,201,346 | Raby et al. | May 21, 1940 |

OTHER REFERENCES

Flader et al.: Modern Photoengraving, Modern Photoengraving Publishers, Chicago (1948), pages 99–101.